United States Patent
Lee (10) Patent No.: US 12,182,061 B2
(45) Date of Patent: Dec. 31, 2024

(54) PROCESSOR FOR PROCESSING EXTERNAL SERVICE REQUESTS USING A SYMMETRICAL NETWORK INTERFACE

(71) Applicant: FOUNDATION OF SOONGSIL UNIVERSITY INDUSTRY COOPERATION, Seoul (KR)

(72) Inventor: Chan Ho Lee, Seoul (KR)

(73) Assignee: FOUNDATION OF SOONGSIL UNIVERSITY INDUSTRY COOPERATION, Seoul (KR)

(*) Notice: Subject to any disclaimer, the term of this patent is extended or adjusted under 35 U.S.C. 154(b) by 365 days.

(21) Appl. No.: 17/696,748

(22) Filed: Mar. 16, 2022

(65) Prior Publication Data
US 2022/0309026 A1   Sep. 29, 2022

(30) Foreign Application Priority Data
Mar. 29, 2021 (KR) .................. 10-2021-0040277

(51) Int. Cl.
G06F 15/78 (2006.01)
G06F 9/30 (2018.01)
G06F 9/38 (2018.01)

(52) U.S. Cl.
CPC ...... *G06F 15/7807* (2013.01); *G06F 9/30145* (2013.01); *G06F 9/3802* (2013.01)

(58) Field of Classification Search
None
See application file for complete search history.

(56) References Cited

U.S. PATENT DOCUMENTS 4,604,500 A * 8/1986 Brown ............... G06F 13/24
379/269
5,125,093 A * 6/1992 McFarland ........ G06F 13/24
710/266

(Continued)

FOREIGN PATENT DOCUMENTS

KR  10-1999-0048631 A   7/1999
KR  10-2003-0050860 A   6/2003
(Continued)

OTHER PUBLICATIONS

'Evaluation of Inter-Process Communication Mechanisms' by Aditya Venkataraman et al., 2015 Technical Report, University of Wisconsin-Madison. (Year: 2015).*

(Continued)

*Primary Examiner* — Steven G Snyder (57) ABSTRACT

A computer processor comprises: a fetch unit that reads and writes instructions and data, a register file including a plurality of registers, which includes a general-purpose register and a special register, an arithmetic logic unit that performs computational processing, a decoder/controller that interprets the instructions and generates a control signal, a symmetric network interface that includes a master interface and a slave interface and that is connected to an on-chip network; and a service controller that receives a service request from the external source through the on-chip network and the symmetric network interface, that communicates with the decoder/controller to send and receive a state of the service request and a state of the computer processor, and that copies an instruction address of a subroutine for executing the service request to a program counter to perform an operation of a designated code when the decoder/controller determines execution of the service request.

14 Claims, 7 Drawing Sheets

(56) References Cited

U.S. PATENT DOCUMENTS

| | | | | |
|---|---|---|---|---|
| 5,796,413 | A * | 8/1998 | Shipp | G09G 5/363 |
| | | | | 345/522 |
| 5,799,195 | A * | 8/1998 | Ross | G06F 15/167 |
| | | | | 710/200 |
| 6,003,129 | A * | 12/1999 | Song | G06F 15/17 |
| | | | | 712/28 |
| 6,308,255 | B1 * | 10/2001 | Gorishek, IV | G06F 12/0831 |
| | | | | 710/305 |
| 6,606,676 | B1 * | 8/2003 | Deshpande | G06F 13/24 |
| | | | | 710/262 |
| 8,914,606 | B2 * | 12/2014 | Culter | G06F 9/5077 |
| | | | | 711/E12.078 |
| 9,524,257 | B2 * | 12/2016 | Bradbury | G06F 9/466 |
| 10,169,267 | B2 * | 1/2019 | Bradbury | G06F 9/467 |
| 10,223,268 | B2 * | 3/2019 | Gschwind | G06F 9/466 |
| 10,331,565 | B2 * | 6/2019 | Gschwind | G06F 12/0842 |
| 11,467,892 | B2 * | 10/2022 | Nore | G06F 9/4418 |
| 2006/0010450 | A1 * | 1/2006 | Culter | G06F 9/5077 |
| | | | | 718/104 |
| 2007/0006231 | A1 * | 1/2007 | Wang | G06F 9/4843 |
| | | | | 712/E9.032 |
| 2009/0249030 | A1 * | 10/2009 | Kwon | G06F 15/167 |
| | | | | 712/E9.002 |
| 2015/0378940 | A1 * | 12/2015 | Bradbury | G06F 9/30145 |
| | | | | 712/244 |
| 2015/0378942 | A1 * | 12/2015 | Bradbury | G06F 9/467 |
| | | | | 710/267 |
| 2017/0242795 | A1 * | 8/2017 | Gschwind | G06F 16/2308 |
| 2017/0242796 | A1 * | 8/2017 | Gschwind | G06F 16/2308 |
| 2021/0034442 | A1 * | 2/2021 | Nore | G06F 9/4418 |
| 2022/0261370 | A1 * | 8/2022 | Otsuka | G06F 13/42 |

FOREIGN PATENT DOCUMENTS

| | | |
|---|---|---|
| KR | 10-2005-0049170 A | 5/2005 |
| KR | 10-2021-0006127 A | 1/2021 |

OTHER PUBLICATIONS

'MultiProcessor Specification—Version 1.4' May 1997. (Year: 1997).*
'Performance Evaluation of Inter-Processor Communication for an Embedded Heterogeneous Multi-Core Processor' by Tsao et al., Journal of Information Science and Engineering 28, 537-554 (2012). (Year: 2012).*

* cited by examiner

[FIG. 1]

- Prior Art -

PROCESSOR FOR PROCESSING EXTERNAL SERVICE REQUESTS USING A SYMMETRICAL NETWORK INTERFACE

CROSS-REFERENCE TO RELATED APPLICATION

This application claims priority under 35 U.S.C. § 119(a) to Korean Patent Application No. 10-2021-0040277 filed in the Korean Intellectual Property Office on Mar. 29, 2021, the entire contents of which are incorporated herein by reference.

BACKGROUND

(a) Technical Field

The present disclosure relates to a processor capable of processing external service requests using a symmetrical network interface.

(b) Background Art

Conventional processor characteristics limit operation to a master processor. Accordingly, communication with a peripheral device that is a slave is possible only by using polling or interrupts. Interrupt schemes commonly in use today require a large processor overhead in processing time.

Processors are generally used to store instructions and data in a main memory, and to read and process the stored instructions and data, which makes a processor as a master. The processor behavior as a master only does not result in any inconvenience.

However, systems having multiple processor cores have become mainstream, even in embedded systems in addition to a PC and a smartphone. In order to fully achieve the advantages of the multiple processor cores, the processor cores are configured to perform parallel processing, in which a task is processed by multiple processors simultaneously in order to reduce processing time.

At present, parallel processing is performed through multi-threaded programming, but designating the parallel processing of a task upon coding is limited and the execution of the task depends on the operating system, which reduces efficiency. One reason for inefficiency is that one processor does not directly receive a task request of another processor due to an asymmetrical interface of the processor, and the operating system performs the task by generating a process or a thread.

In a conventional system, when there are multiple processors for parallel processing, a main (or parent) process (PP) is generated and executed in one processor, and when the parallel processing using another processor is required by the parent process, child processes or threads are generated and executed by the operating system. The number of simultaneous child processes to be executed is determined by the number of available processors, which may not be the same as the number of child processes generated by the parent process.

That is, in the case of the parallel processing in the conventional computing system, in general, one (parent) process is generated, and then a child process or thread is generated by the operating system to perform a task when it is requested by the process, and data is shared by directly accessing a memory in a shared region or through interprocess communication (IPC), and then a result is obtained. Hereinafter, the 'child process or thread' is referred to as the 'child process'.

In the conventional parallel processing case, the parent process waits for an execution result of the child process or performs a task not requiring a result of the child process. The operating system generates the child process, and the overhead for allocating memory for the child process, copying information and data occurs. Even when the child process is terminated, overhead is incurred for releasing the memory and storing data. Therefore, when the child process is frequently generated and then terminated during execution of one process for the parallel processing, performance deterioration occurs due to the incurred overhead.

Further, performance is also negatively affected because a waiting time may be generated until the result is delivered to the parent process, even after termination of the child process during parallel processing. In the conventional computer system, a processor that executes the parent process does not directly control a processor that executes the child process and requests the operating system to generate the child process, which executes a task requested by the parent process in another processor.

That is, a waiting time is required until the child process actually starts execution after the parent process requests the task, and that waiting time is variable. Further, another waiting time may occur from completion of the task until the parent process receives the result.

Figure 1:
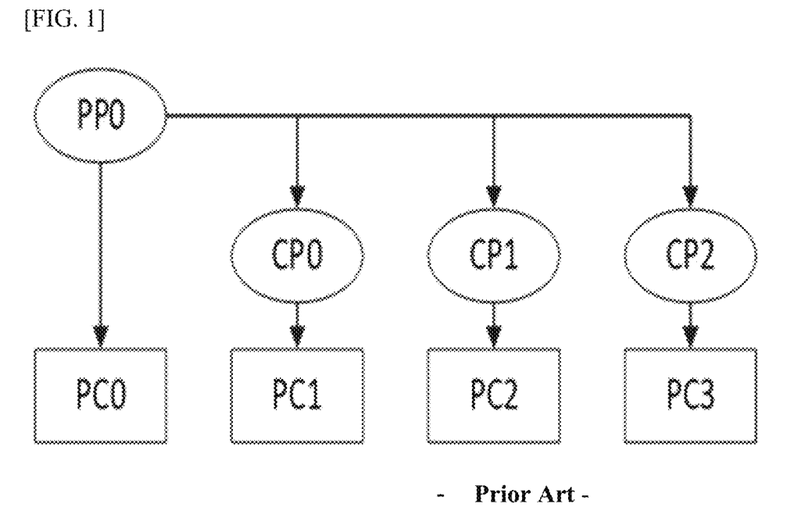
FIG. 1 is a diagram illustrating parallel processing of a conventional computer system.

FIG. 1 is a diagram illustrating parallel processing in a conventional computer system.

Referring to FIG. 1, when a program is executed according to a request of a user, an operating system generates parent process 0 (PP0) and allows processor core 0 (PC0) to execute PP0. Thereafter, when PP0 requests tasks to other processors for parallel processing, the operating system sequentially generates child processes CP0, CP1, and CP2 and sequentially allocates CP0, CP1, and CP2 to processor cores PC1, PC2, and PC3 to execute operations requested by the parent process. A solid arrow of FIG. 1 is performed by the operating system.

In the case of an embedded system without an operating system, each process may execute an independent program and may use a scheme of making an interrupt request by using a shared memory or using a peripheral device to share data. All operations should be synchronized while executing the independent program in each processor, and as a result, control is complicated and efficiency deteriorates.

SUMMARY OF THE DISCLOSURE

In order to solve the problems in the related art, the present disclosure discloses a processor that can perform external service requests by using a symmetrical network interface and by using simple control scheme to increase processing efficiency.

According to an aspect of the present disclosure, provided is a computer processor that processes service requests from an external source, the computer processor comprising: a fetch unit that reads and writes instructions and data; a register file including a plurality of registers, which includes a general-purpose register and a special register; an arithmetic logic unit that performs computational processing; a decoder/controller that interprets the instructions and generates a control signal; a symmetric network interface that includes a master interface and a slave interface and that is connected to an on-chip network; and a service controller that receives a service request from the external source through the on-chip network and the symmetric network interface, that communicates with the decoder/controller to send and receive a state of the service request and a state of the computer processor, and that copies an instruction address of a subroutine for executing the service request to a program counter to perform an operation of a designated code when the decoder/controller determines execution of the service request.

The service request is defined as a task request input into the slave interface from the external device through the on-chip-network, and the service request is stored in an internal buffer of the service controller.

The service request includes a start address of the subroutine for executing the service, and a service type (ST) and a service priority (PR).

The service type is information for determining the operation mode of the computer processor, and the service priority is information for determining an execution order of a plurality of services stored in the internal buffer.

The service controller compares an incoming service request with the service request that is currently waiting in the buffer and determines the order of execution according to a priority, and requests the decoder/controller to execute a service having the highest priority, and the decoder/controller may temporarily suspend a current process and execute the service request when the priority of the service request is higher than the priority of the currently executing process.

The computer processor is a first processor among a plurality of computer processors, and a parent process of the first processor transmits a first service request to execute a desired function by designating one or more second processors from among the plurality of computer processors when parallel processing is required, and the first processor receives a task completion signal from the one or more second processors as a service request.

The first service request is broadcasted to the one or more second processors simultaneously to process the first service request efficiently.

The one or more second processors stores resulting data of the service by the first processor in a main memory, and receives an access authority to a cache controller of the first processor and stores the resulting data in a data cache of the first processor.

The processor transmits the second service request to at least one from among the plurality of remaining processors, including the processor executing the first service request, without waiting for the result of the first service request, when a second service request corresponding to a subsequent task of the first service request does not depend on the result of the first service request.

The computer processor transmits the second service request to at least one from among the plurality of remaining processors, including the processor completing the task according to the first service request when the task according to the first service request is completed, when the second service request corresponding to the subsequent task of the first service request depends on the result of the first service request.

The computer processor is a first processor, which is one of a plurality of computer processors sharing a symmetric network interface, and a request input through the symmetric network interface is stored in a buffer included in the service distributor, and the service distributor distributes the request to one of the plurality of computer processors according to a predetermined policy.

The computer processor is a general-purpose processor performing a general computation or a control function or a specific-purpose processor for performing a specific computation in a heterogeneous multiple processor system, and the computer processor receives the service request from the general-purpose processor or the specific-purpose processor included in the heterogeneous multiple processor system.

The computer processor is a general-purpose processor or a computing processor of a Graphic Processor Unit (GPU) or Neural Processing Unit (NPU) system, and the computer processor receives the service request from one or more general-purpose processors or computing processors included in the Graphic Processor Unit (GPU) or Neural Processing Unit (NPU) system.

According to another aspect of the present disclosure, provided is a computer processor capable of processing external service requests, the computer processor comprising: a plurality of processor cores each including a fetch unit reading and writing instructions and data, a register file with a set of registers that includes a general-purpose register and a special register, an arithmetic logic unit (ALU)/calculation unit for computation processing, a decoder/controller interpreting the instructions and generating a control signal, and a symmetric network interface having a master interface and a slave interface; and a service controller that communicates with the decoder/controller of each of the plurality of processor cores to send and receive a state of the service request and a state of each of the plurality of processor cores when a service request is received from at least one other device of a peripheral device connected to an on-chip-network through the symmetric network interface, and that copies an instruction address of a subroutine for executing the service request to the program counter to perform an operation of a designated code when the decoder/controller determines execution of the service request.

According to the present disclosure, one processor makes a direct service request without overhead of child process generation to a plurality of other processors to efficiently perform parallel processing by using a service controller and a symmetrical network interface, and is capable of external interrupt request processing without an IRQ pin by using a service processing function.

Further, according to the present disclosure, when the processor receives a service request from a peripheral device having the symmetrical network interface, the processor can handle an interrupt processing request, and as a result, the processor does not require an interrupt input pin and an interrupt processing logic for interrupt processing, and when the peripheral device has only a slave interface, an interrupt controller having the symmetrical network interface can make a service request to the processor by receiving the interrupt request of the peripheral device.

DETAILED DESCRIPTION

The present disclosure may have various modifications and various embodiments, and specific embodiments will be illustrated in the drawings and described in detail.

However, this does not limit the present disclosure to specific embodiments, and it should be understood that the present disclosure covers all the modifications, equivalents and replacements included within the idea and technical scope of the present disclosure. In describing each drawing, reference numerals refer to like elements.

Prior to describing a processor of the present disclosure, a conventional processor will be first described for comparison.

Figure 2:
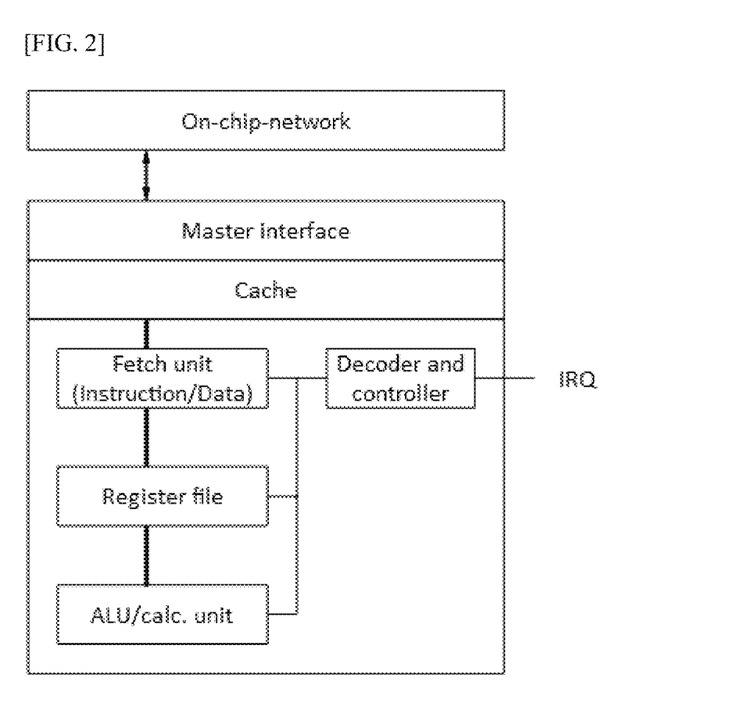
FIG. 2 is a diagram illustrating a core function in a simplified architecture of a conventional processor.

FIG. 2 is a diagram illustrating a core function in a simplified architecture of a conventional processor.

Referring to FIG. 2, the conventional processor consists of a fetch unit for reading and writing instructions and data, a register file, which is a set of various registers including general-purpose registers and special registers, an arithmetic logic unit (ALU)/calculation (calc) unit taking charge of various computations, and a decoder/controller interpreting the instructions and generating a control signal.

The fetch unit reads the instruction from a memory address stored in a program counter (PC) of the register file.

When the address is changed, a program or a function stored in a new address is executed.

When a new process is generated and executed, the memory address stored in the program counter is changed to perform an operation corresponding to the process.

Further, the processor has an unprivileged operation mode for a user and various privileged operation modes for error processing, interrupt processing, a supervisor operation, and so on. The processor has a dedicated register set used in each operation mode, and some special registers are shared across the operation modes.

The program counter is shared in each operation mode and the processor executes instructions corresponding to a specific operation mode by writing a start address of instructions designated for the operation mode to the program counter.

The decoder/controller changes the operation mode by writing a value of a state register indicating a processor state when a corresponding operation is required. The interrupt handling mode caused by an interrupt request (IRQ) signal is the only operation mode that is triggered by an external request. The interrupt request signal is not a normal communication using an on-chip-network, but is made through a separate IRQ pin, and in general, an interrupt controller receives the IRQ signal from a peripheral device and delivers the received interrupt request signal to the IRQ pin of the processor.

Accordingly, it is very difficult for one processor (PA) to send the interrupt request signal to another processor (PB), and even though the interrupt request signal is received by PB, continuing to perform the task requested by PA results in large overhead.

Figure 3:
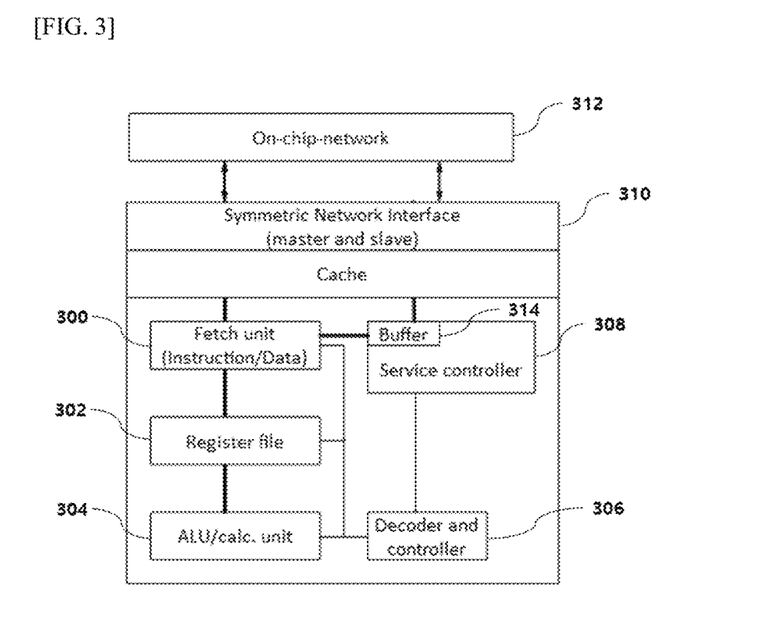
FIG. 3 is a diagram illustrating a simplified processor architecture according to an embodiment of the present disclosure.

FIG. 3 is a diagram illustrating a simplified processor architecture according to an embodiment of the present disclosure. FIG. 3 illustrates a core function of a processor.

As illustrated in FIG. 3, a processor according to an embodiment includes a fetch unit 300, a register file 302, an ALU/calc unit 304, and a decoder/controller 306, which are also elements included in a conventional processor. The processor of FIG. 3, however, additionally includes a service controller 308.

When there is a service request from at least one of the peripheral device, a homogeneous processor, and a heterogeneous processor, the service controller 308 communicates with the decoder/controller 306 to send and receive a state of the service request and a state of the processor. When the decoder/controller 306 determines execution of the service request, the service controller 308 copies an instruction address of a subroutine for the service request to the program counter to perform an operation of a designated code.

Further, the processor according to the embodiment includes a symmetric interface 310 having a master interface and a slave interface, unlike a conventional processor architecture that only has a master interface.

The processor may start a communication through an on-chip-network 312 and respond to a communication request of another device due to the symmetric network interface 310.

Accordingly, the processor according to the embodiment may receive a service request sent by another device, and may store the service request in an internal buffer 314 of the service controller 308.

The service request may be a task request that is input into the slave interface (or an input interface) through the on-chip-network 312.

Information included in the service request may include a start address of the subroutine for the service, a service type (ST) and a service priority (PR).

The operation mode of the processor may be determined by the service type. That is, the operation mode of the processor for the service request may vary depending on the service type, and the service controller 308 checks the service type to determine the operation mode of the processor and requests a change to a required operation mode to the decoder/controller 306 as required. For example, when a task of reading and computing data in a user memory is requested, the processor operates in a user mode. Alternatively, the processor operates in a privileged mode, such as a supervisor mode, when accessing data in the kernel memory or in the peripheral device is required. A name and a type of the operation mode may be different for each processor.

According to embodiments of the disclosure when there is a service request that cannot be performed in the operation mode of the conventional processor, a new operation mode required for the corresponding service may be added to the architecture of the processor as a privileged operation mode.

The service priority indicates a priority of service execution, and when the service is executed, the priority of the processor operation mode is first applied, and when the operation mode is the same, an execution order is determined by the service priority.

Accordingly, a substantial priority is determined by combining the operation mode and the service priority. Hereinafter, a priority means a result from considering the operation mode of the processor and the service priority.

When a service having a higher priority than a process being currently executed is input, the processor temporarily suspends the current process and may process the service having the higher priority first.

According to embodiments of the disclosure, when performing a task having a higher priority than an incoming service request, the processor performs the service request after completing the current task. When the processor temporarily suspends a process in order to perform a service request having a higher priority, the processor compares a subsequent service request that is waiting with the temporarily suspended process after completing the current service, and then performs the task having a higher priority.

Further, since the service controller 308 may store a plurality of service requests in the internal buffer 314, the service requests are stored in the order of execution according to the priority. When a new service request is input, the service requests are reordered according to priority.

When a service request is input, if the priority of the service is higher compared with the priority of the process that is being currently executed, then the service controller 308 sends a signal to the decoder/controller 306, and the decoder/controller 306 compares the signal with the stored information. The operation mode is changed and the instruction address corresponding to the subroutine of the higher priority service is set in the program counter to execute when required by the comparison result.

Figure 4:
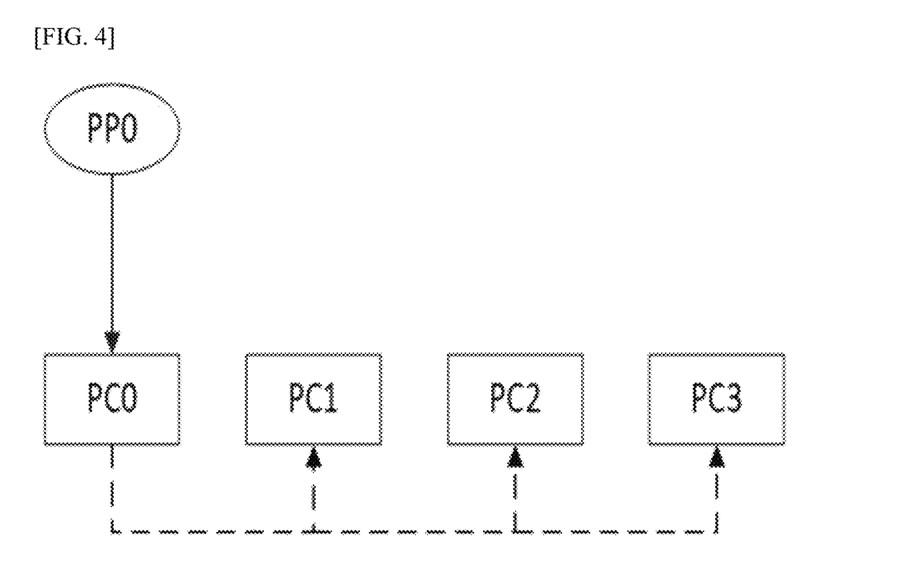
FIG. 4 is a diagram illustrating parallel processing in a system including multiple processors according to an embodiment of the present disclosure.

FIG. 4 is a diagram illustrating parallel processing in a system including multiple processors according to an embodiment of the present disclosure.

In a system including multiple processors, one processor (PC0) starts a parent process (PP0), and then transmits a service request to designated processors (PC1, PC2, and PC3) for the parallel processing to execute a task, and the designated processors transmit service requests that signal task completion to the service controller 308 of the processor (PC0) through the slave interface when the designated processor completes the service execution according to the service request. The processor designated for the parallel processing may be assigned by a user or by the operating system.

For example, PC0 makes the service request to PC1 to perform a task and the last instruction of the service executed by PC1 may be making the service request for a subsequent task to be performed by PC0 after PC1 completes the task.

PC1 may store the service request in the internal buffer 314 of the service controller 308, so PC0 may request a subsequent service to PC1 even before the request of the previous service is completed, when the subsequent task requested by PC0 does not depend on the result of the previous task. Similarly, PC0 may request a second service to other designated processors when the second services do not depend on the results of the first service requests, and the other designated processors, such as PC2 and PC3, also may execute the second service requests immediately without waiting for the subsequent service requests of PC0 after completing the first service requests.

When resulting data is required after executing a service, the resulting data may be stored in a cache in advance through a cache controller of PC0 as well as in a main memory. To this end, the cache controller of a processor is accessible by other processors. For example, a first processor may authorize an access to the cache controller of a second processor.

This scheme reduces a memory access time for the first processor to read the resulting data in the main memory, which enhances performance.

According to embodiments of the disclosure, the processor maintains compatibility of operation with a conventional processor. Thus, except for the operation of receiving and storing the service request through a slave interface and processing that service request according to the priority, the processor may be used in a conventional system without modifying the operating system and application programs.

Meanwhile, when a program utilizing the processor architecture according to disclosed embodiments is executed, the task can control another processor directly in the program code and the result may be immediately received by the service request after the task is completed, and as a result, processor execution efficiency may be increased.

Further, when a compiler supports the processor or a dedicated library is used, a programmer may allow the compiler or the operating system to appropriately allocate the processor without designating a specific processor directly.

According to disclosed embodiments, when a peripheral device of a processor also has a symmetric network interface, the peripheral device may make a service request to the processor, and as a result, when the peripheral device delivers the result after performing the task according to the request of the processor or announces the result to the processor for an operation according to an external input, the peripheral device may perform the same operation through the service request instead of the conventional interrupt request operation.

Accordingly, in processors according to the embodiments, the IRQ pin and the interrupt operation mode are not required and interrupt requests may be processed by the service request.

Figure 5:
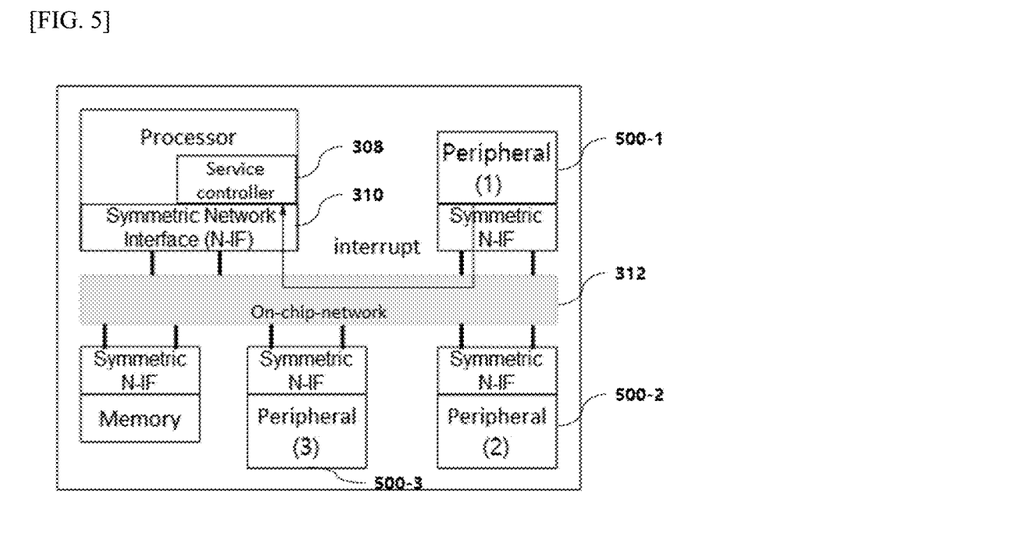
FIG. 5 is a diagram illustrating an interrupt request processing scheme of a symmetrical network interface system according to an embodiment of the present disclosure.

FIG. 5 is a diagram illustrating an interrupt request processing scheme of a symmetrical network interface system according to an embodiment of the present disclosure.

As illustrated in FIG. 5, in a system using a symmetric network interface, interrupt handling is performed using the same scheme as service request processing when peripheral devices 500-1 to 500-3 directly send an interrupt packet as a service request to the processor and store the service request in the service controller 308.

Accordingly, in terms of the processor, a dedicated IRQ pin and an interrupt controller, which are included in a conventional system, are not required because the interrupt request is a part of the service request.

Figure 6:
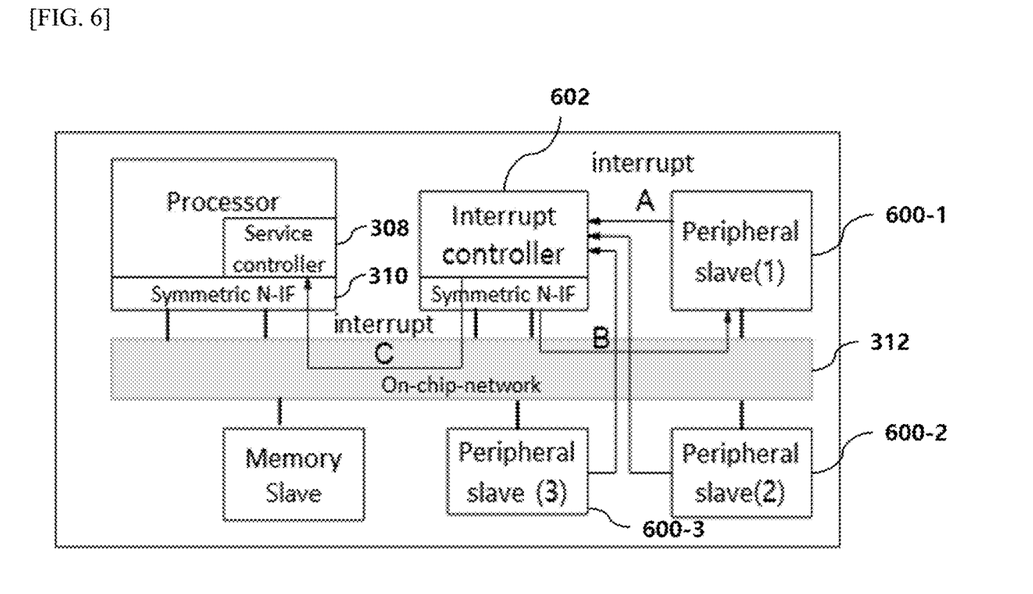
FIG. 6 is a diagram illustrating an interrupt processing method when using a processor in an asymmetrical network interface system according to an embodiment of the present disclosure.

FIG. 6 is a diagram illustrating an interrupt handling method when using a processor in an asymmetrical network interface system according to an embodiment of the present disclosure.

In an asymmetric network interface system, peripheral devices 600-1 to 600-3 have only a slave interface, so an interrupt controller 602 with a symmetric network interface is provided.

A peripheral device (e.g., 600-1, 600-2 or 600-3) transmits an interrupt request signal through the IRQ pin at A, the interrupt controller 602 reads required information by accessing the peripheral device at B and generates an interrupt packet, and then transmits the service request to a service controller 308 of the processor at C. A subsequent process is the same as that in the system using the symmetric network interface.

When only the processor is replaced, and all peripheral devices including the interrupt controller or an accelerator are the same as they are in a conventional system, the IRQ pin is connected to the service controller 308, which handles the interrupt request when the interrupt request signal is input, in order to maintain compatibility with the conventional system.

In FIG. 6, service request information is stored in advance in a designated location of an internal buffer (not illustrated), and when the interrupt request signal is input, a service request for interrupt processing is executed and a subsequent process is the same as that of the system with a symmetric network interface.

Figure 7:
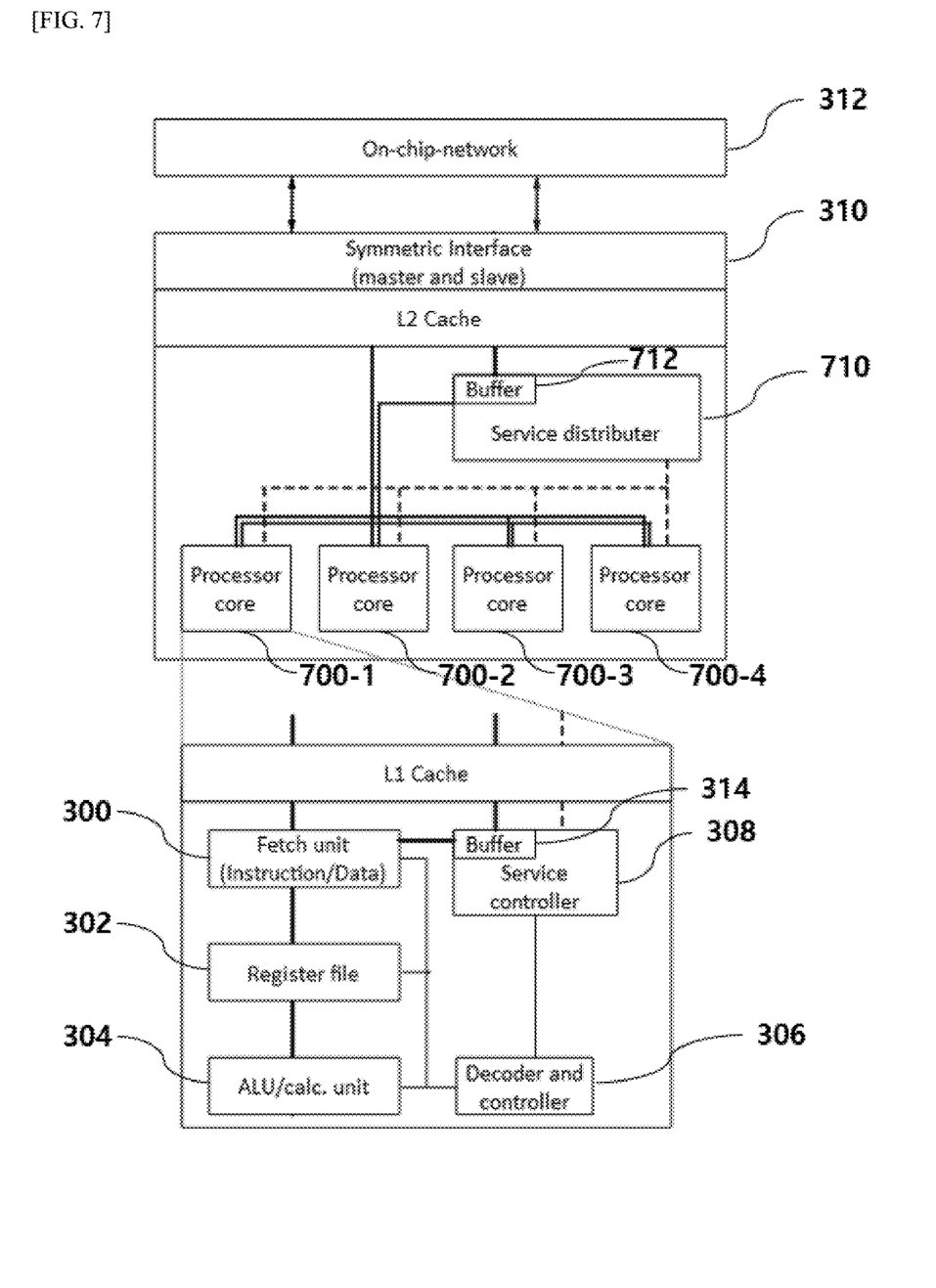
FIG. 7 is a diagram illustrating multiple processor cores sharing one network interface (N-IF) according to an embodiment of the present disclosure.

FIG. 7 is a diagram illustrating multiple processor cores sharing one network interface (N-IF) according to an embodiment of the present disclosure.

When multiple processor cores share one symmetric network interface, a service request may be input through an on-chip-network 312 and is stored in a buffer 712, which included in a service distributor 710. The service distributor 710 distributes the service request to each processor core having identical elements (e.g., 700-1 through 700-4) according to a predetermined policy as illustrated in FIG. 7. A service controller 308 of a processor core stores and processes the service request sent by the service distributor 710, and sends service processing state information of the corresponding processor core 700 to the service distributor 710. A service processing state may include a buffer state of the service controller 308 and a priority of a current process. The service distributor 710 may use the service processing state information for a service distribution policy. Further, the service distributor 710 may determine a service request order regardless of an arrival order according to the priority of the service request, and may select a processor core that can process a service request most rapidly to deliver the service request for rapid processing.

When the multiple processor cores share one symmetric network interface, the buffer sizes of the service distributor 710 and the service controller 308 may be adjusted depending on the system design. For example, the service distributor 710 may not include the buffer 712 or the service controller 308 may not include a buffer 314. When the service controller 308 does not include a buffer, the service distributor 710 may send the service request when a processor core is capable of processing the service request immediately, and as a result, the service distributor 710 may determine a service request processing order. When the service distributor 710 does not include the buffer, the service distributor 710 distributes the service request to the processor core according to the service distribution policy immediately when the service request arrives, and as a result, the service request processing order is determined according to the states of processor cores.

The service controller 308 analyzes the service request and determines when to request the service execution depending on the processor core state.

When a plurality of processor cores 700-1 to 700-4 are included, the service request may include information for designating the processor core.

When designating the processor core, the service distributer 710 delivers the service request to the designated processor core. When the processor core is not designated, the service distributer 710 selects the processor core that will handle the service request, and delivers the service request according to a predetermined distribution policy by considering the processor state.

According to embodiments, in a homogeneous multiple processor system, the operating system allocates processor cores available within the number of processor cores requested by the process upon generating the process.

Figure 8:
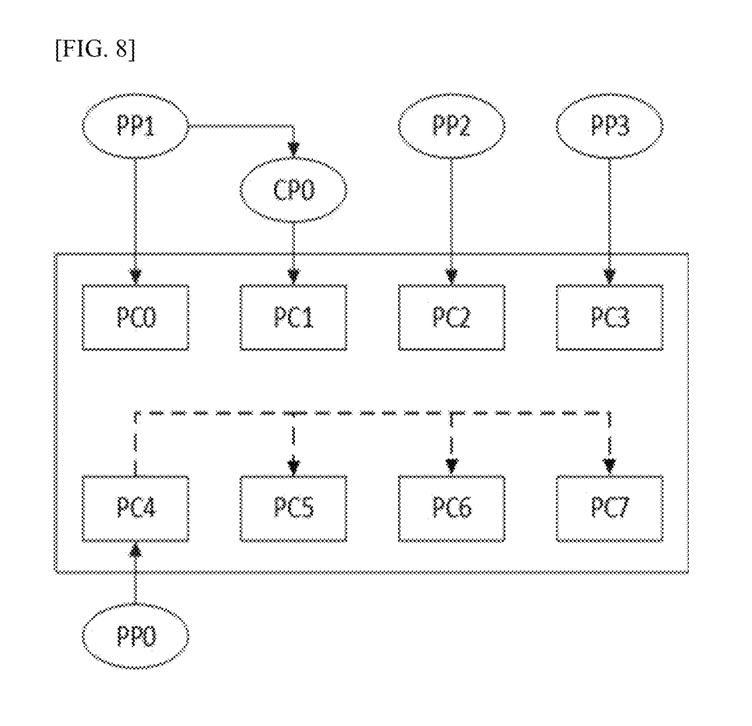
FIG. 8 is a diagram illustrating a parallel processing operation of a homogeneous multiple processor system according to an embodiment of the present disclosure.

FIG. 8 is a diagram illustrating a parallel processing operation of a homogeneous multiple processor system according to an embodiment of the present disclosure.

In FIG. 8, four processors (PC4 to PC7) are allocated for a parent process PP0, and PP0 is executed in PC4. PP0 directly requests tasks to three processors (PC5 to PC7) for parallel processing through the service request scheme without the use of the operating system, and the three processors (PC5 to PC7) announce task completion to PP0 when they complete the tasks.

When the same service requests are transferred to three processors (PC5 to PC7), the service request may be broadcasted to the three processors simultaneously to process the service requests efficiently.

A processor other than PC4 may request a service. For example, PC5 may make a service request to PC6, PC7, or PC4. Since there is no intervention by the operating system in this process, there is no overhead incurred for context switching, and as a result, performance is enhanced.

A process that does not require the service request scheme or that is created by a code according to a conventional scheme is allocated to a processor with the help of the operating system, as illustrated in FIG. 8 by PP1 to PP3 and CP0.

According to disclosed embodiments, when the operating system generates a process, the homogeneous multiple processor system allocates the available processor cores within the number of processor cores requested by the generated process, and the processor transmits a first service request to at least one of the remaining processors for a task that may be subjected to the parallel processing. When a second service request corresponding to a subsequent task of the first service request does not depend on the result of the first service request, the processor may transmit the second service request to at least one of the remaining processors, including the processor performing the first service request, without waiting for the result of the first service request. Further, when the second service request corresponding to the subsequent task of the first service request depends on the result of the first service request, the processor may transmit the second service request to at least one of the remaining processors after the first service request is completed.

In general, the heterogeneous multiple processor systems include general-purpose processors for overall control and general computation and specific-purpose processors for specific computation. Although heterogeneous multiple processors use different instruction set architecture (ISA), the fundamentals of the proposed service handling scheme for the heterogeneous multiple processor system is the same as those for the homogeneous multiple processor system as long as the heterogeneous processors include the service controllers to handle service requests. The illustration in FIG. 8 may be applied to a heterogeneous multiple processor system except that PC0 to PC7 may be heterogeneous processors. However, the coding for the heterogeneous multiple processor system may be more complicated than that for the homogenous multiple processor system because of the different instruction set architecture.

The conventional system allows a general-purpose processor to directly provide instructions to specific-purpose processors by storing instructions for the specific-purpose processors in a specific address area of the main memory or in a memory for the specific-purpose processor in advance. The specific-purpose processor may execute the instructions according to a request of the general-purpose processor.

A general-purpose processor does not need to directly control the specific-purpose processor in detail because the specific-purpose processor is also a processor. When the general-purpose processor makes a request, the specific-purpose processor executes the pre-stored instructions.

Graphics Processing Units (GPU) or Neural Processing Units (NPU) include a plurality of computing processors, and each computing processor can execute its dedicated instructions like a general-purpose processor, but the instructions are loaded on the dedicated memory area in advance and the same operation is repeatedly performed. When another task is performed, loading another set of instructions is required, and overhead is therefore larger, and as a result, it is difficult to change tasks frequently. Accordingly, it is more difficult to frequently load and execute instructions for performing different tasks for each computing processor, and the performance deterioration is also increased.

Figure 9:
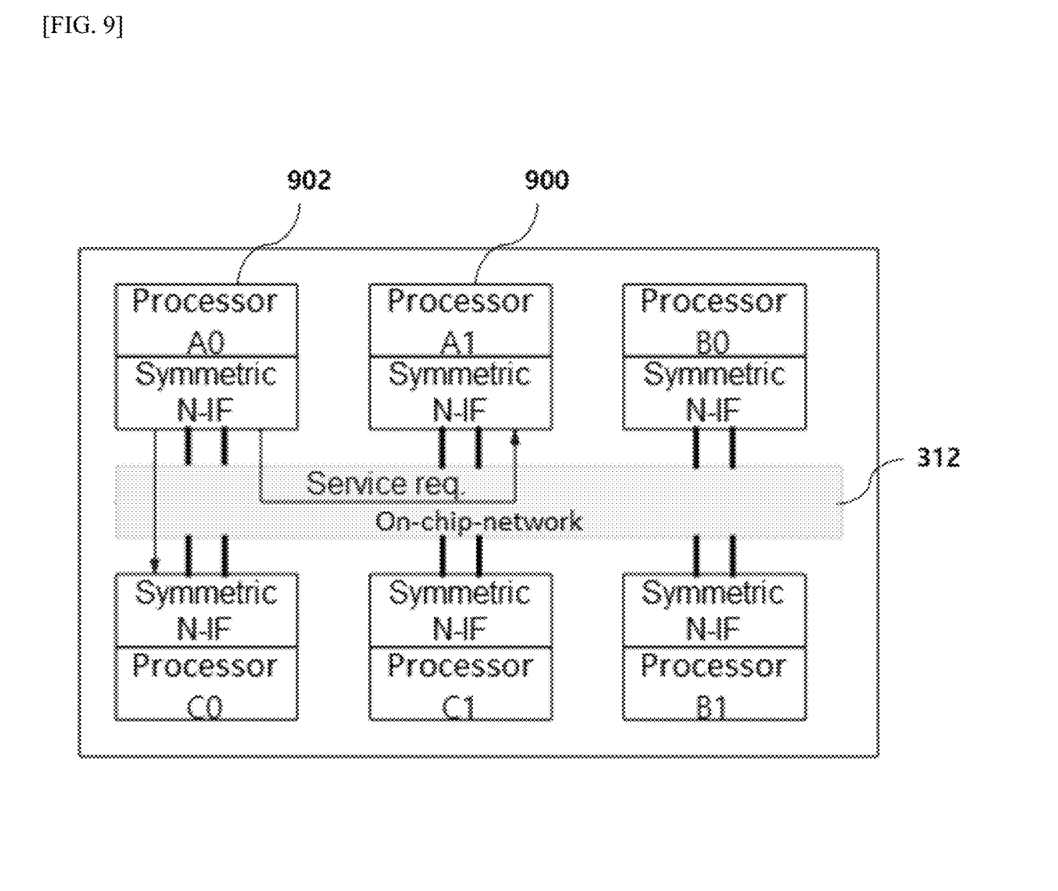
FIG. 9 is a diagram illustrating a parallel processing operation of a heterogeneous multiple processor system according to an embodiment of the present disclosure.

FIG. 9 is a diagram illustrating a parallel processing operation of a heterogeneous multiple processor system according to an embodiment of the present disclosure.

When a specific-purpose processor 900 has a service execution function, a general-purpose processor 902 may dynamically designate a subroutine to be executed, through a service request, directly to the specific-purpose processor 900 as illustrated in FIG. 9.

That is, when the general-purpose processor 902 designates a specific specific-purpose processor 900 and delivers a memory address for instructions, the general-purpose processor 902 may request that the specific-purpose processor 900 performs a desired operation, and as a result, this operation scheme in the heterogeneous multiple processor system is practically the same as that in the homogeneous multiple processor system.

However, a difference remains because instructions for the specific-purpose processor are different from those for the general-purpose processor, and as a result, different types of instructions are included in the code for heterogeneous processors in an instruction memory area for a process in the heterogeneous multiple processor system. Therefore, the instruction blocks for the corresponding processors need to be managed by the process, and a linker should support the management scheme or the programmer should provide information for the memory management to the linker when building a program.

Furthermore, it is also possible for a general-purpose processor to make a service request to another general-purpose processor.

Alternatively, if the specific-purpose processor such as the GPU or NPU has a dedicated instruction memory and a general-purpose processor loads multiple sets of instructions on the dedicated instruction memory in advance, then the specific-purpose processor can immediately execute the service when the general-purpose processor makes the service request to one or more specific-purpose processors. As a result, performance is enhanced. In this example, the dedicated instruction memory of the specific-purpose processor should have a size that is sufficient to accommodate both an instruction set of a task that is being currently executed and an instruction set to be sequentially executed.

When the heterogeneous multiple processor system of FIG. 9 is used, a specific-purpose processor such as the GPU, the NPU, or a digital signal processor (DSP) may be more efficiently operated.

In particular, the GPU and the NPU are configured to have dozens to thousands of basic computing processors and to gather a certain number of the basic computing processors to behave as an independent computing unit that executes a set of pre-loaded instructions. As described above, overhead is large for loading a set of instructions due to the architecture of the system, and as a result, it is difficult to request various operations that require frequent loading of instructions When each basic computing processor in the GPU or the NPU includes a service controller and the general-purpose processors are included in the GPU and the NPU as a controller, performance may be significantly enhanced.

For example, when one or more general-purpose processors are included in a heterogeneous multiple processor system with the GPUs or the NPUs, the general-purpose processor allocates vector and matrix computations to the computing processors (GPUs or NPUs), and the general-purpose processor takes charge of a complicated control operation. When there are a lot of control operations, a task can be allocated from a main general-purpose processor to a subsidiary general-purpose processor by increasing the overall number of general-purpose processors to distribute the load. When the type of task is changed, the general-purpose processor loads a new set of instructions and requests the task.

Figure 10:
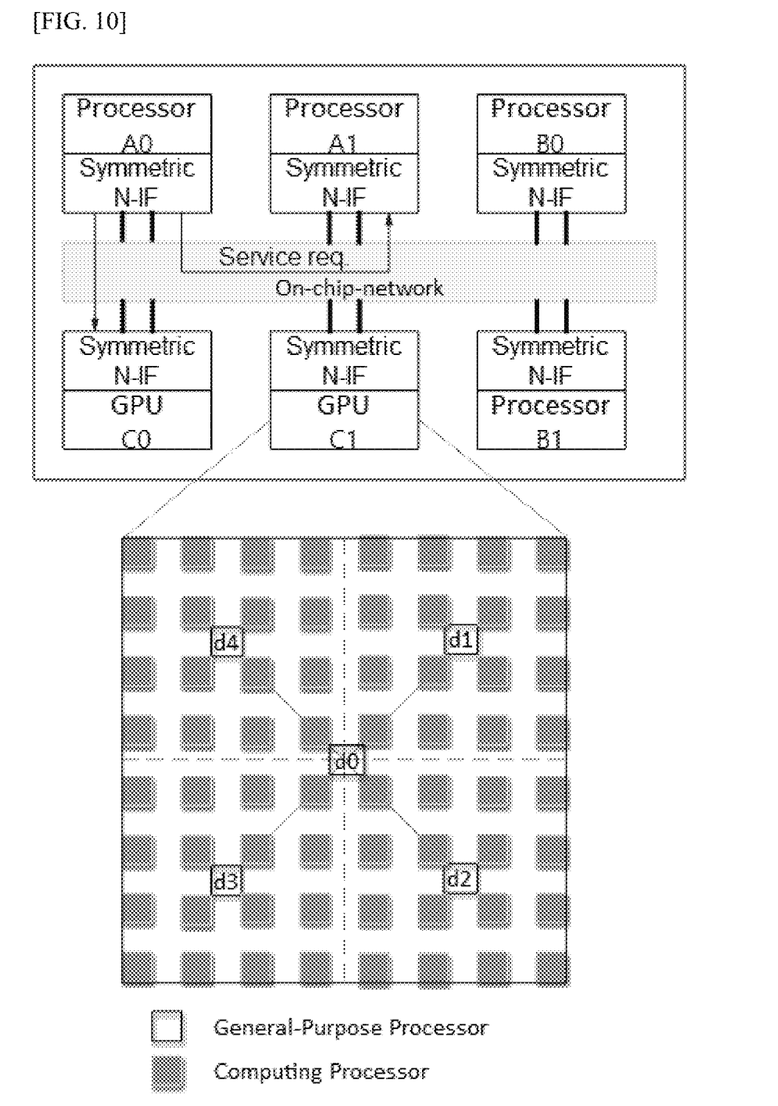
FIG. 10 is a diagram illustrating an example of a GPGPU (General-Purpose Graphic Processor Unit) that includes five general-purpose processors and sixty-four computing processors according to an embodiment of the disclosure.

FIG. 10 is a diagram illustrating an example of a GPU includes five general-purpose processors and sixty-four basic computing processors according to an embodiment of the disclosure.

A central general-purpose processor d0 may control four other general-purpose processors d1 to d4. Each of four general-purpose processors may control sixteen basic computing processors, and the GPU itself may perform one process according to a request of one of the general-purpose processors (A0, A1, B0, or B1). Alternatively, the four general-purpose processors A0, A1, B0, and B1 control d1 to d4, respectively, that is, each controls a quadrant of the GPU, and they request individual services to the quadrants of the GPU through d1 to d4. When the amount of computation is not large, processors A0, A1, B0, and B1 may generate and send a service request only to d1, and d1 may distribute the service request of each general-purpose processor (A0, A1, B0, or B1) to the basic computing processors appropriately. Accordingly, the computing resource may be more efficiently and flexibly used as compared with a conventional GPU. In other embodiments, various numbers of general-purpose processors and computing processors can be used. When the same service requests are transferred to a plurality of basic computing processors, the service request may be broadcasted to the plurality of basic computing processors simultaneously to process the service requests efficiently.

It will be apparent to those skilled in the art that the embodiment of the present disclosure is disclosed for a purpose of exemplification, and various modifications, additions, and substitutions are possible, without departing from the spirit and scope of the inventions as defined by the appended claims and the modifications, changes, and additions should be considered as falling within the scope of the following claims.

What is claimed is:

1. A computer processor that processes service requests from an external source, the computer processor comprising:

a fetch unit that reads and writes instructions and data;

a register file including a plurality of registers, which includes a general-purpose register and a special register;

an arithmetic logic unit that performs computational processing;

a decoder/controller that interprets the instructions and generates a control signal; and a service controller that receives a service request from another device including a homogeneous processor or a heterogeneous processor through an on-chip network, analyzes the service request, communicates with the decoder/controller to receive status of the homogeneous processor or the heterogeneous processor and to determine whether to execute the service request, requests the decoder/controller to execute the service request, and controls an operation of a designated code when the decoder/controller determines to execute the service request.

2. The computer processor of claim 1, wherein the service request is defined as a task request input from another device through the on-chip-network, and the service request is stored in an internal buffer of the service controller.

3. The computer processor of claim 2, wherein the service request includes a start address of a subroutine for executing the service request, and a service type (ST) and a service priority (PR).

4. The computer processor of claim 3, wherein the service type is information for determining an operation mode of the computer processor, and the service priority is information for determining an execution order of a plurality of service requests stored in the internal buffer.

5. The computer processor of claim 4, wherein the service controller compares an incoming service request with the service request that is currently waiting in the buffer and determines the execution order according to a priority, and requests the decoder/controller to execute a service request having the highest priority, and the decoder/controller temporarily suspends a current process and executes the service request when the priority of the service request is higher than the priority of the current process.

6. The computer processor of claim 1, wherein the computer processor is a first processor among a plurality of computer processors, and a parent process of the first processor transmits a first service request to execute a desired function by designating one or more second processors from among the plurality of computer processors when parallel processing is required, and the first processor receives a task completion signal from the one or more second processors as a service request.

7. The computer processor of claim 6, wherein the first service request is broadcasted to the one or more second processors simultaneously to process the first service request.

8. The computer processor of claim 6, wherein the one or more second processors stores resulting data of the first service request by the first processor in a main memory, and receives an access authority to a cache controller of the first processor and stores the resulting data in a data cache of the first processor.

9. The computer processor of claim 6, wherein the computer processor transmits a second service request to at least one from among a plurality of remaining processors, including the processor executing the first service request, without waiting for a result of the first service request, when the second service request corresponding to a subsequent task of the first service request does not depend on the result of the first service request.

10. The computer processor of claim 6, wherein the computer processor transmits a second service request to at least one from among a plurality of remaining processors, including the processor completing a task according to the first service request when the task according to the first service request is completed, when the second service request corresponding to a subsequent task of the first service request depends on a result of the first service request.

11. The computer processor of claim 1, wherein the computer processor is a first processor, which is one of a plurality of computer processors sharing a symmetric network interface, and a request input through the symmetric network interface is stored in a buffer included in a service distributor, and the service distributor distributes the request to one of the plurality of computer processors according to a predetermined policy.

12. The computer processor of claim 1, wherein the computer processor is a general-purpose processor performing a general computation or a control function or a specific-purpose processor for performing a specific computation in a heterogeneous multiple processor system, and the computer processor receives the service request from the general-purpose processor or the specific-purpose processor included in the heterogeneous multiple processor system.

13. The computer processor of claim 1, wherein the computer processor is a general-purpose processor or a computing processor of a Graphic Processor Unit (GPU) or a Neural Processing Unit (NPU) system, and the computer processor receives the service request from one or more general-purpose processors or computing processors included in the Graphic Processor Unit (GPU) or the Neural Processing Unit (NPU) system.

14. A computer processor capable of processing external service requests, the computer processor comprising:

a plurality of processor cores each including a fetch unit reading and writing instructions and data, a register file with a set of registers that includes a general-purpose register and a special register, an arithmetic logic unit (ALU)/calculation unit for computation processing, a decoder/controller interpreting the instructions and generating a control signal, and a symmetric network interface having a master interface and a slave interface; and a service controller that receives a service request from another device including a homogeneous processor or as heterogeneous processor through an on-chip network, analyzes the service request, communicates with the decoder/controller of each of the plurality of processor cores to receive status of the homogeneous processor or the heterogeneous processor and to determine whether to execute the service request, requests the decoder/controller to execute the service request, and controls an operation of a designated code when the decoder/controller determines to execute the service request.

* * * * *